F. C. ROBERTS & R. H. MILLER.
REFRIGERATING CHAMBER FOR COOLING AIR.
APPLICATION FILED NOV. 25, 1908.

953,179.

Patented Mar. 29, 1910.

WITNESSES:

INVENTORS

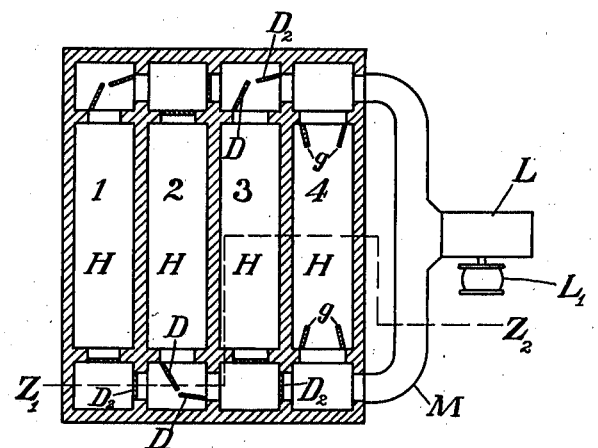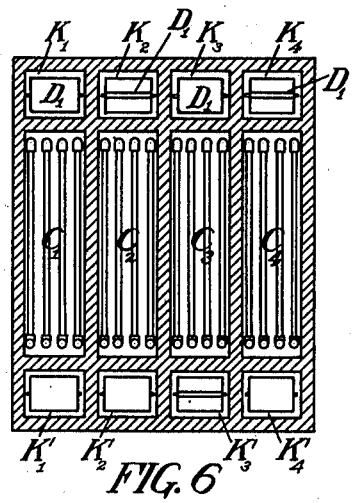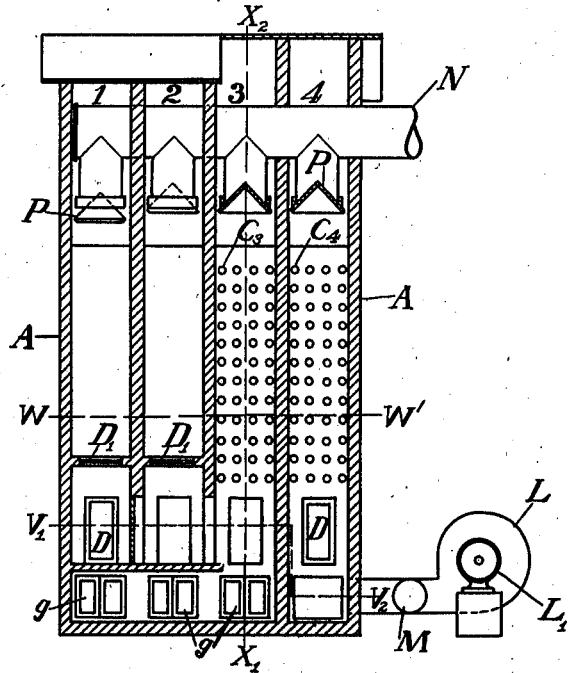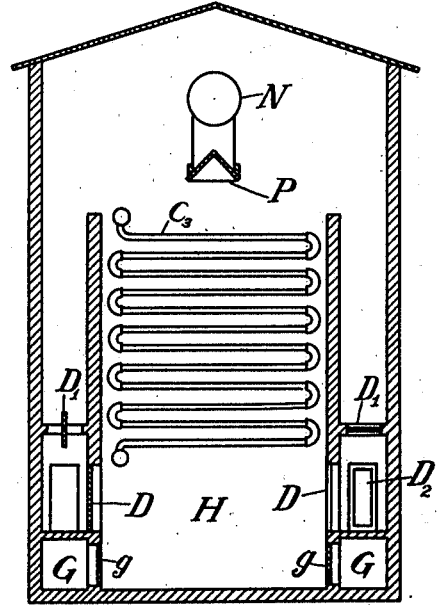

F. C. ROBERTS & R. H. MILLER.
REFRIGERATING CHAMBER FOR COOLING AIR.
APPLICATION FILED NOV. 25, 1908.

953,179.

Patented Mar. 29, 1910.
3 SHEETS—SHEET 3.

WITNESSES:

INVENTORS

UNITED STATES PATENT OFFICE.

FRANK C. ROBERTS, OF BRYN MAWR, AND RANDOLPH H. MILLER, OF NOBLE, PENNSYLVANIA.

REFRIGERATING-CHAMBER FOR COOLING AIR.

953,179.

Specification of Letters Patent. Patented Mar. 29, 1910.

Application filed November 25, 1908. Serial No. 464,472.

*To all whom it may concern:*

Be it known that we, FRANK C. ROBERTS, a citizen of the United States, residing at Bryn Mawr, in the county of Montgomery and State of Pennsylvania, and RANDOLPH H. MILLER, a citizen of the United States, residing at Noble, in the county of Montgomery and State of Pennsylvania, have invented certain new and useful Improvements in Refrigerating-Chambers for Cooling Air, of which the following is a specification.

Our invention relates to refrigerating chambers containing pipes in which some approved refrigerating medium, such as cold brine or anhydrous ammonia is circulated and over which pipes the air to be cooled is passed.

In cooling air in a refrigerating chamber it has been the practice to cause the air to enter at the bottom, to pass upward over the pipes containing the refrigerating medium and to leave the chamber at the top. It is found however that the operation of the refrigerating chamber is more efficient if it is divided into two or more compartments containing pipes into which the refrigerating medium is introduced, and the air to be cooled is caused to pass through two or more compartments in succession in such manner that the air on leaving the top of one compartment enters the second compartment at the bottom.

The object of our invention is to provide a refrigerating chamber in which such a circulation of air is possible.

Figure 1:
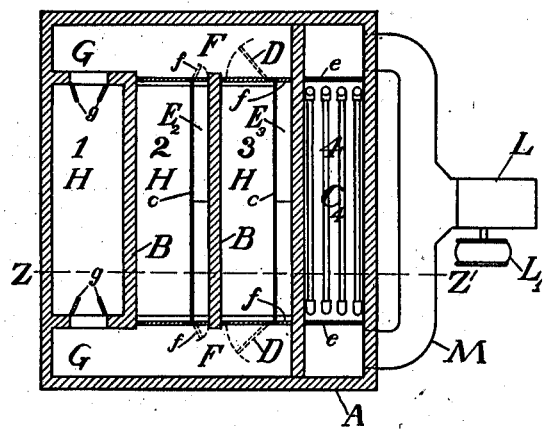
Figure 2:
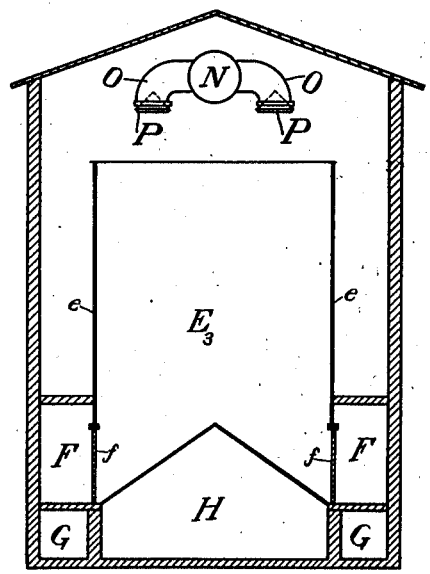
Figure 4:
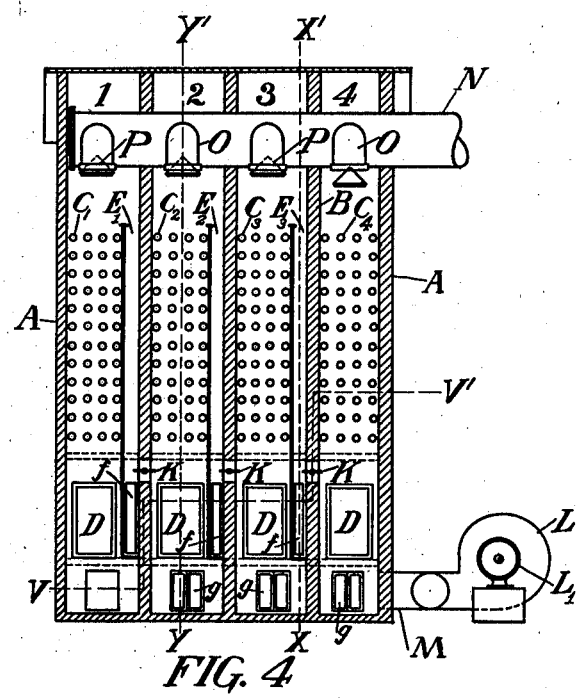
Figure 3:
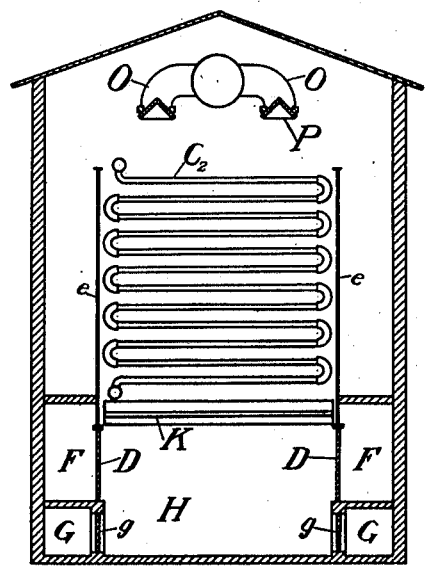
Figure 9:
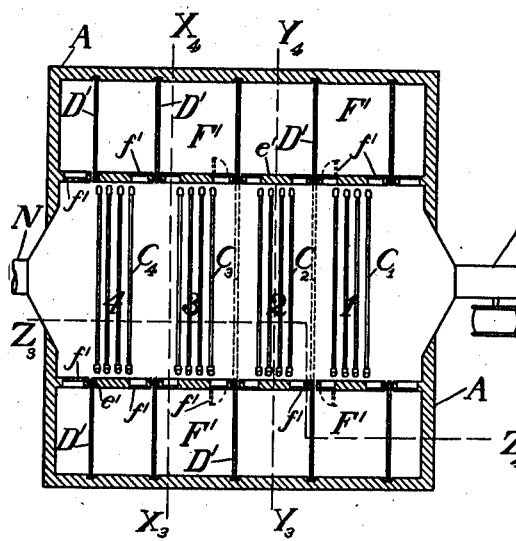
Figure 10:
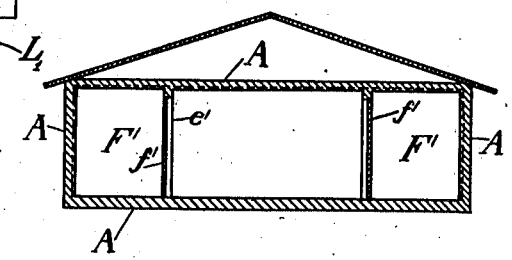
Figure 12:
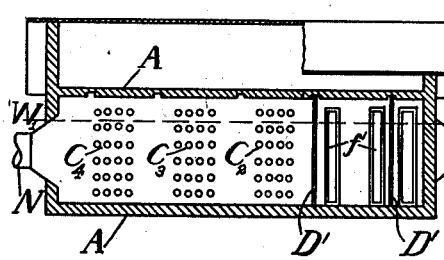
Figure 11:
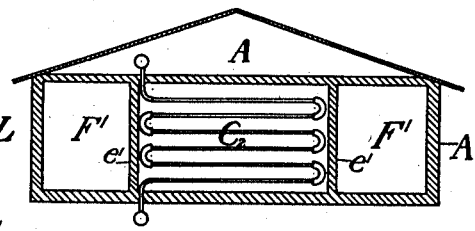

We attain our object by means of the construction illustrated in the accompanying drawings in which, Figure 1 is a horizontal section through the refrigerating chamber on line V V' of Fig. 4; Fig. 2 is a vertical section through the refrigerating chamber on line X X' of Fig. 4; Fig. 3 is a vertical section on line Y Y' of Fig. 4 and Fig. 4 is a longitudinal vertical section through the refrigerating chamber on line Z Z' of Fig. 1. Fig. 5 is a horizontal section on line $V_1 V_2$ of Fig. 7; Fig. 6 is a horizontal section on line W W' of Fig. 7; Fig. 8 is a vertical section on line $X_1 X_2$ of Fig. 7 and Fig. 7 is a vertical section on line $Z_1 Z_2$ of Fig. 5. Fig. 9 is a horizontal section on line $W_1 W_2$ of Fig. 12; Fig. 10 is a vertical section on line $X_3 X_4$ of Fig. 9; Fig. 11 is a vertical section on line $Y_3 Y_4$ of Fig. 9 and Fig. 12 is a vertical section on line $Z_3 Z_4$ of Fig. 9.

Similar characters refer to similar parts through the several views.

Referring to Figs. 1, 2, 3 and 4:—A represents the inclosing walls of the refrigerating chamber and B the walls dividing the chamber in four compartments, 1, 2, 3 and 4. $C_1 C_2 C_3$ and $C_4$ represent the pipe coils in each compartment into which the refrigerating medium is introduced. The pipe coils are separated from the passages $E_1 E_2$ and $E_3$ by dividing walls $c$, said passages being formed by $c$, B and the end walls $e$. Passages $E_1 E_2$ and $E_3$ are open at the top and communicate at the bottom with passages F through doors $f$. H is an open space in each compartment under the pipe coils $C_1 C_2 C_3$ and $C_4$ which space communicates with passages F through doors D and with passages G through doors $g$. Openings are provided between the bottoms H of compartments 2, 3 and 4 respectively with passages $E_1 E_2$ and $E_3$ said openings being controlled by valves K. L is a fan operated by motor $L_1$ whereby air is forced through pipe M into the passages G and from thence to the open spaces H through doors $g$. N is a pipe leading from the top of the refrigerating chamber through which the air is drawn or discahrged from the refrigerating chamber; connections O equipped with valves P being provided from N to the several compartments.

The operation of the apparatus is as follows:—The fan L being in operation delivering air into passages G, the doors $g$ at the bottom of compartment 1 are opened whereby the air is admitted to H in the bottom of 1, and passes upward over the pipe coils $C_1$. Valves P at the tops of compartment 1, 2 and 3 being closed, valve P at the top of 4 being open and valves K at the bottoms of $E_1 E_2$ and $E_3$ being open, the air passes down $E_1$, through K and into H at the bottom of 2, thence upward over $C_2$, downward through $E_2$ into H at the bottom of 3, thence upward over $C_3$, downward through $E_3$ into H at the bottom of 4, thence upward over $C_4$ and out of the refrigerating chamber through valves P, connections O and pipe N. In passing over the coils $C_1 C_2 C_3$ and $C_4$ the air is lowered in temperature and the moisture in the air thereby deposited on the pipe coils in the form of water or, in case the temperature of the refrigerating medium is low enough, in the form of snow or frost. In the latter case the snow or frost will accumulate on the pipes to such an extent as to interfere with the passage of the air over the coils and reduce the efficiency of the latter; as a result it becomes necessary at intervals to discontinue the use of one of the compartments while the operation of the removal of the snow from the pipes in said compartment is under way, it being desirable however to maintain the balance of the apparatus in use. The removal of the snow or frost may be accomplished in any approved manner, such as by passing hot liquid through the pipe coils or causing hot or warm liquid to pass over the coils. Assuming that it is necessary to discontinue the use of compartment 1 and maintain the other compartments in operation. In this case, doors $g$ at the bottom of 1 and valve K between $E_1$ and the bottom of compartment 2 are closed; doors $g$ at the bottom of 2 are opened, the air being admitted from G to H at the bottom of 2 and the circulation of air secured as already described through $C_2$ $E_2$ $C_3$ $E_3$ and $C_4$ to the pipe N. In case it is desired to discontinue the use of compartment 2 and maintain the other compartments in use the operation may be as follows:—Doors $g$ at the bottom of 2 should be closed likewise valves K at the bottom of $E_1$ and $E_2$; doors $f$ at each side of the bottom of $E_1$ and doors D at the bottom of 3 are opened. In this case air being admitted to H at the bottom of 1 passes upward over $C_1$, downward through $E_1$ and into passages F through doors $f$, from whence it passes into H under 3 through doors D, upward over $C_3$, downward through $E_3$ and upward over $C_4$ from whence it passes out of the refrigerating chamber by pipe N as previously described. When it becomes necessary to discontinue the use of compartment 3, doors $f$ at the bottom of $E_2$ are opened, all other doors $f$ being closed, doors D at the bottom of 4 are opened all other doors D being closed and valves K at the bottom of $E_2$ and $E_3$ are closed, the other valve K being open. In this case after passing through 1 and 2 the air passes out of $E_2$ into F through doors $f$ and returns into the bottom of 4 through door D from whence it passes upward over $C_4$ and out of the refrigerating chamber as before described. The use of compartment 4 may be discontinued by closing valve K at the bottom of $E_3$, and valves P at the top of 4 and opening valves P at the top of 3;
in this case the air would enter and circulate as in the first case described except that on reaching the top of 3, the air would pass through valves P into N.

We do not limit our invention to the particular arrangement of compartments and air passages shown on the drawings; any arrangement may be used provided the air passes in the same direction over the pipe coils in all the compartments which are in use.

Figs. 5, 6, 7 and 8 show another arrangement of refrigerating chamber wherein the passages $E_1$ $E_2$ and $E_3$ of the previously described arrangement at the sides of the coils are omitted, and communication between the different compartments provided by passages $K_1$ $K_2$ $K_3$ $K_4$ at one end of the pipe coils in the respective chambers, and $K_1'$ $K_2'$ $K_3'$ and $K_4'$ at the other end of the pipe coils in the respective chambers. The circulation of air in this arrangement of refrigerating chamber may be described as follows:—Doors $g$ under compartment 4 being opened the air is forced by fan L into the bottom H of compartment 4 from whence it passes upward over the pipe coils $C_4$ and downward through passage $K_4$. Doors $D_1$ at the bottom of $K_4$ and door $D_2$ controlling the connection between 4 and 3 at the bottom of $K_4$ being open and door D leading from the bottom of $K_3$ into H at the bottom of 3 being open, the air passes from the bottom of $K_4$ into H at the bottom of compartment 3 from whence it passes upward over the pipe coils $C_3$, thence downward through $K_3'$. Doors $D_1$ at the bottom of $K_3'$ and door $D_2$ controlling the connection between 3 and 2 at the bottom of $K_3'$ being open, the air passes from the bottom of $K_3'$ into the bottom H of compartment 2 through open door D from whence it passes upward over the pipe coils $C_2$, thence downward through $K_2'$. Doors $D_1$ and $D_2$ at the bottom of $K_2$ being open, the air passes from the bottom of $K_2$ into the bottom H of compartment 1 through open door D from whence it passes upward over the pipe coils $C_1$. Valve P being open, the air passes from 1 into N by which it passes out of the refrigerating chamber. The drawings show the various doors open or closed as the case may be, in order to secure the above described operation. If in the above described operation it becomes necessary to discontinue the use of compartment 3 and pass the air from compartment 4 to compartment 2 and thence to 1, the operation would be as follows:— Door D leading from the bottom of $K_3$ to the bottom H of 3 should be closed and door D leading from the bottom of $K_2$ to the bottom H of 2 should be open; likewise door $D_2$ controlling the connection between the bottoms of $K_3$ and $K_2$ should be open. In this case the air passes from $K_4$ into the bottom H of 2 from whence it passes upward over the coils $C_2$ and thence downward through $K_2'$. Door $D_1$ at the bottom of $K_2'$ and door $D_2$ leading from $K_2'$ to $K_1'$ should be open while door $D_2$ leading from $K_3'$ to $K_2'$ and the door D leading from $K_2'$ to the bottom H of 2 should be closed and door D leading from the bottom of $K_1'$ to the bottom H of 2 should be open, in which case the air on leaving $K_2'$ will pass into the bottom H of 1 and thence upward over $C_1$ and outward through open valve P to N. It is evident the use of any compartment may be discontinued by the opening or closing of the proper doors.

In the above descriptions the air is passed upward over the pipe coils; it is evident however that in each description the air may be caused to pass downward over the pipe coils by delivering the air into the refrigerating chamber by the pipe N and having it leave the chamber by pipe M. It is also evident that if Figs. 4 and 7 be considered as horizontal sections through the chamber instead of vertical sections, the air may be caused to pass horizontally over the pipe coils instead of vertically.

Figs. 9, 10, 11 and 12 show another arrangement of the refrigerating chamber wherein the air is caused to pass horizontally over the pipe coils instead of vertically as in the arrangements heretofore described. In this arrangement pipe coil sets $C_1$ $C_2$ $C_3$ and $C_4$ are provided in a chamber having a passage $F'$ on each side of said chamber divided from said chamber by walls $e'$. Sliding doors $D'$ are shown in the drawings as extending across the passages $F'$; these sliding doors may be moved into the chamber containing the pipe coils as indicated by the dotted lines on each side of pipe coil $C_2$, thus dividing the chamber into compartments 1, 2, 3 and 4. Doors $f'$ are placed in the wall $e'$ on each side of all doors $D'$ except doors $D'$ at the far end of $C_4$ where doors $f'$ are provided only on one side of $D'$ as shown. The operation of this arrangement of apparatus is as follows:— The fan L being in operation the air is delivered into the chamber containing the pipe coils and passes in succession over pipe coils $C_1$ $C_2$ $C_3$ and $C_4$; doors $D'$ being in the position shown in Fig. 9 and all doors $f'$ being closed, the air enters pipe N by which it passes out of the refrigerating chamber. The doors $D'$ and $f'$ are utilized in case it is desired to discontinue the use of one set of the pipe coils in order to remove the snow or frost therefrom. For instance, if it is necessary to discontinue the use of pipe coils $C_2$, doors $D'$ on each side of $C_2$ are moved into the chamber as indicated by the dotted lines in Fig. 9 and doors $f'$ shown as open in dotted lines in Fig. 9 are opened; in this case the air after passing over $C_1$ enters the two passages $F'$ through the open doors $f'$ and reënters the chamber through open doors $f'$ located beyond $C_2$ from whence the air passes over $C_3$ and $C_4$ and thence outward through pipe N. The dotted lines in Fig. 9 on each side of $C_2$ and the open doors $f'$ shown also in dotted lines in Fig. 9, indicate the position respectively of $D'$ and $f'$ when $C_2$ is out of use. It is evident that the arrangement is such that the use of either $C_1$ $C_2$ $C_3$ and $C_4$ may be discontinued by a proper adjustment of doors $D'$ and $f'$ and that in all cases the air passes over the sets of pipe coils which are in use in succession and in the same direction.

We do not limit our invention to any particular arrangement of the pipes into which the refrigerating medium is introduced; any desirable arrangement may be used.

We do not limit our invention to any particular method for introducing the refrigerating medium into the pipes or to any particular system of circulation for said medium; any desirable method or system may be used.

We do not limit our invention to an arrangement wherein the air is forced into the refrigerating chamber by a fan; if preferred an exhaust fan or the suction side of a blowing engine may be connected to the pipe N and the air drawn through the refrigerating chamber.

We interpret the words "refrigerating medium" to mean any gas, liquid or a combination of both that may be found desirable to use in the apparatus, provided only that the temperature of the refrigerating medium, or that created by the refrigerating medium, is lower than the temperature of the air to be treated.

Having described our invention what we claim and desire to cover by Letters Patent is—

1. In a refrigerating chamber for cooling air, a plurality of compartments, pipes in the compartments, through which a refrigerating medium passes, means for causing the air to be cooled to pass through a plurality of compartments, passages connecting the compartments so that the air may be caused to pass in the same direction through a plurality of compartments successively, and valves whereby the passage of air through one or more compartments may be discontinued without changing the direction of the passage of air through the remaining compartment or compartments.

2. In a refrigerating chamber for cooling air, a plurality of compartments, pipes in the compartments through which a refrigerating medium passes, means for causing the air to be cooled to pass through a plurality of compartments, passages connecting the compartments so that the air may be caused to pass in the same direction through a plurality of compartments successively but in reverse direction through the passages, and valves whereby the passage of air through one or more compartments may be discontinued without changing the direction of the passage of air through the remaining compartment or compartments.

3. In a refrigerating chamber for cooling air, two or more compartments containing pipes into which a refrigerating medium is introduced, means for causing the air to be cooled to pass through two or more compartments of said refrigerating chamber, means consisting of passages whereby the air to be cooled is passed in the same direction and in succession through two or more of said compartments and means consisting of passages and valves or doors whereby the passage of air through one or more compartments may be discontinued.

FRANK C. ROBERTS.
RANDOLPH H. MILLER.

Witnesses:
WILBUR F. SMITH,
CLARENCE S. BUTLER.